United States Patent
Kitano et al.

(10) Patent No.: US 9,796,825 B2
(45) Date of Patent: Oct. 24, 2017

(54) INTERLAYER FOR LAMINATED GLASS, AND LAMINATED GLASS

(75) Inventors: Hirofumi Kitano, Kouka (JP); Juichi Fukatani, Kouka (JP); Daizou Ii, Kouka (JP); Ryuta Tsunoda, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 264 days.

(21) Appl. No.: 13/991,618

(22) PCT Filed: Dec. 9, 2011

(86) PCT No.: PCT/JP2011/078594
§ 371 (c)(1),
(2), (4) Date: Jun. 4, 2013

(87) PCT Pub. No.: WO2012/077794
PCT Pub. Date: Jun. 14, 2012

(65) Prior Publication Data
US 2013/0288061 A1    Oct. 31, 2013

(30) Foreign Application Priority Data

Dec. 9, 2010  (JP) ................... 2010-274746

(51) Int. Cl.
*C08K 3/22* (2006.01)
*C08K 5/098* (2006.01)
(Continued)

(52) U.S. Cl.
CPC .......... *C08K 3/22* (2013.01); *B32B 17/10633* (2013.01); *B32B 17/10678* (2013.01);
(Continued)

(58) Field of Classification Search
USPC .......................... 428/437; 524/91, 359, 400
See application file for complete search history.

(56) References Cited

U.S. PATENT DOCUMENTS

| 6,673,456 B1 | 1/2004 | Kobata et al. |
| 2005/0181220 A1 | 8/2005 | Kobata et al. |

(Continued)

FOREIGN PATENT DOCUMENTS

| CN | 101006023 A | 7/2007 |
| CN | 101784386 A | 7/2010 |

(Continued)

OTHER PUBLICATIONS

Machine_English_Translation_JP_2001261383_A; Interlayer for Laminated Glass and Laminated Glass; Sep. 26, 2001; JPO; whole document.*

(Continued)

*Primary Examiner* — Tahseen N Khan
(74) *Attorney, Agent, or Firm* — Cheng Law Group, PLLC

(57) ABSTRACT

Provided is an interlayer film for laminated glass which has high heat shielding properties, a high visible transmittance, and excellent light resistance which enables retention of the high visible transmittance for a long period of time. The interlayer film for laminated glass according to the present invention has an interlayer film for laminated glass with a single layer structure or a laminated structure of two or more layers, the interlayer film for laminated glass according to the present invention comprises a first layer, and the first layer contains a polyvinyl acetal resin; a plasticizer; a tungsten oxide particle; a magnesium salt of an organic acid having a branched structure; and a metal salt of a C2 to C8 organic acid, other than the magnesium salt of an organic acid having a branched structure.

10 Claims, 2 Drawing Sheets

(51) Int. Cl.
    *C08K 5/07* (2006.01)
    *B32B 17/10* (2006.01)
    *C08K 5/3475* (2006.01)
(52) U.S. Cl.
    CPC .. *B32B 17/10688* (2013.01); *B32B 17/10761* (2013.01); *C08K 5/07* (2013.01); *C08K 5/098* (2013.01); *C08K 5/3475* (2013.01); *B32B 2250/03* (2013.01); *Y10T 428/3163* (2015.04)

(56) References Cited

U.S. PATENT DOCUMENTS

| | | |
|---|---|---|
| 2006/0008640 A1 | 1/2006 | Chonan et al. |
| 2007/0134487 A1 | 6/2007 | Marumoto |
| 2009/0035583 A1* | 2/2009 | Fisher .................... 428/432 |
| 2012/0244363 A1 | 9/2012 | Fisher |

FOREIGN PATENT DOCUMENTS

| | | |
|---|---|---|
| EP | 1 036 775 A1 | 9/2000 |
| EP | 2 009 046 A1 | 12/2008 |
| JP | 2001-106555 A | 4/2001 |
| JP | 2001-240435 A | 9/2001 |
| JP | 2001-261383 A | 9/2001 |
| JP | 2001261383 A * | 9/2001 |
| JP | 2010-535695 A | 11/2010 |
| WO | WO-01/25162 A1 | 4/2001 |
| WO | WO-2005/087680 A1 | 9/2005 |
| WO | WO-2007/130773 A1 | 11/2007 |
| WO | WO-2009/020806 A1 | 2/2009 |
| WO | WO-2010/030444 A1 | 3/2010 |

OTHER PUBLICATIONS

The First Office Action for the Application No. 201180059698.9 from The State Intellectual Property Office of the People's Republic of China dated Dec. 24, 2014.
International Preliminary Report on Patentability (PCT/IPEA/409) for Application No. PCT/JP2011/078594 mailed Jun. 13, 2013.
Supplementary European Search Report for the Application No. EP 11 84 6423 dated Jun. 23, 2016.
International Search Report for the Application No. PCT/JP2011/078594 dated Feb. 28, 2012.
International Preliminary Report on Patentability (PCT/IPEA/409) for the Application No. PCT/JP2011/078594 dated Sep. 12, 2012.

* cited by examiner

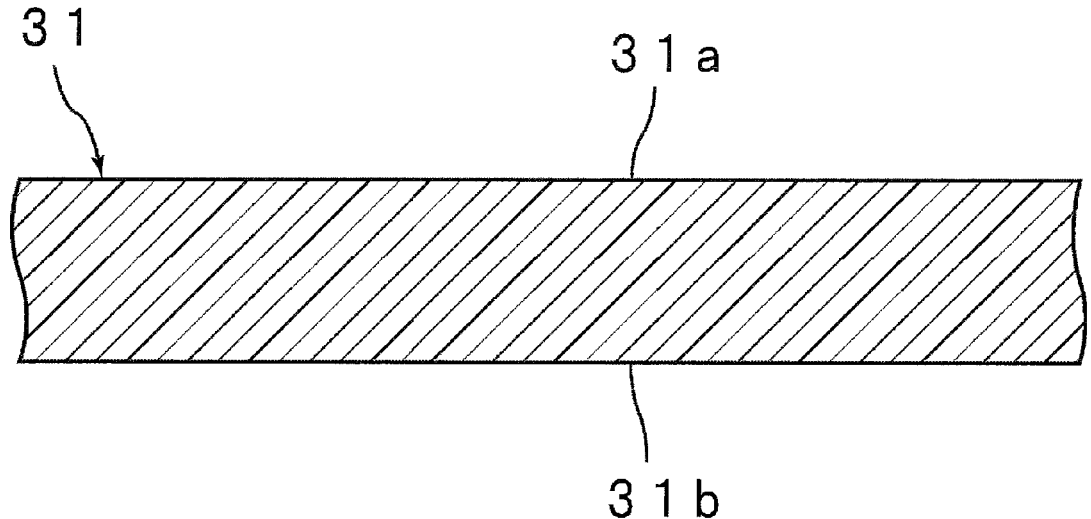
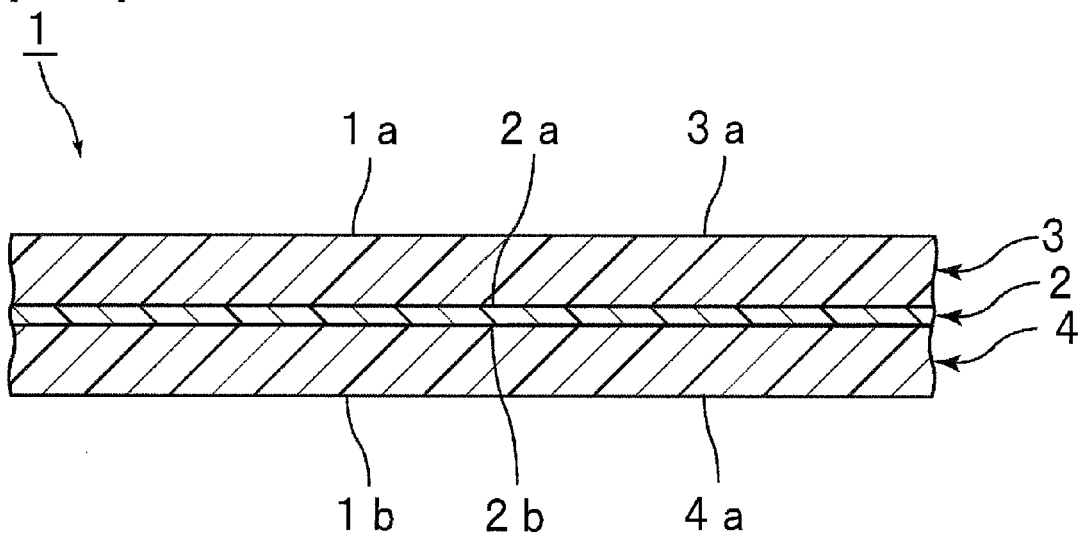

[FIG. 3]
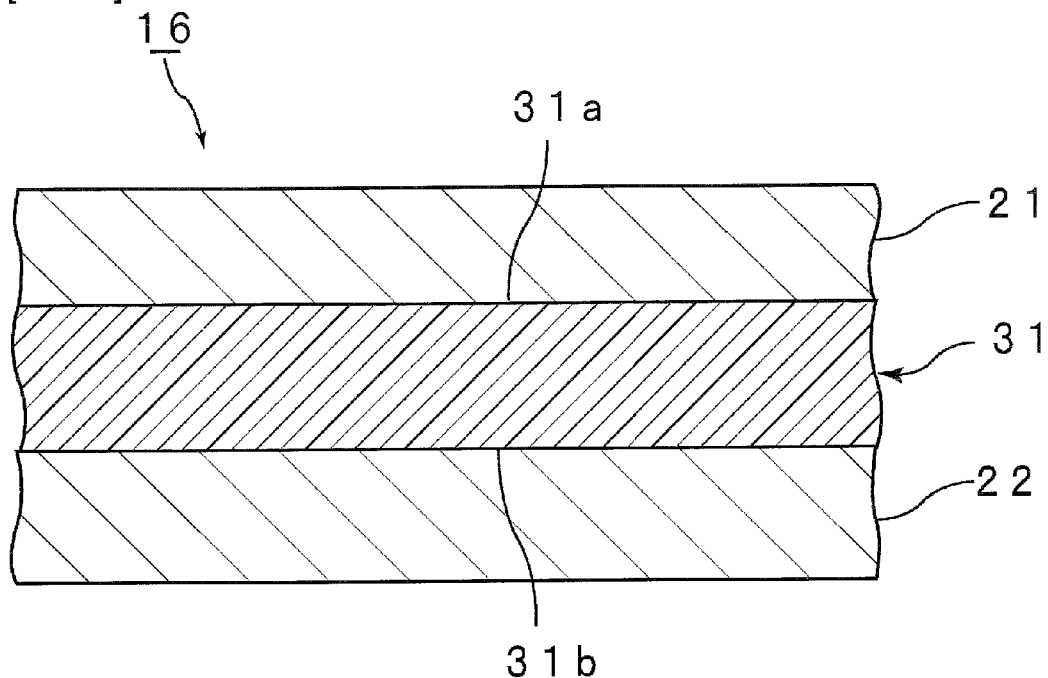
[FIG. 4]
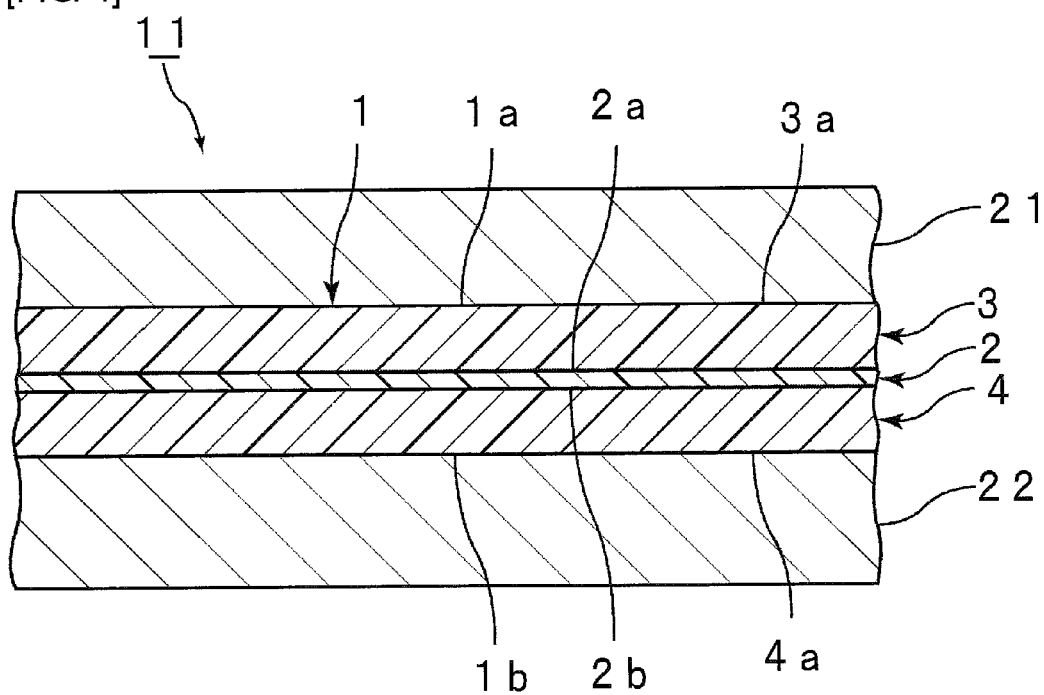

INTERLAYER FOR LAMINATED GLASS, AND LAMINATED GLASS

TECHNICAL FIELD

The present invention relates to an interlayer film for laminated glass which is used for laminated glass for vehicles and buildings. More specifically, the present invention relates to an interlayer film for laminated glass which enables production of laminated glass having high heat shielding properties, and to laminated glass including the interlayer film for laminated glass.

BACKGROUND ART

Laminated glass is safety glass which, even when broken by impact from the outside, shatters into few flying glass fragments. For this reason, laminated glass is widely used for applications such as cars, rail cars, aircrafts, boats and ships, and buildings. Laminated glass is produced by sandwiching an interlayer film for laminated glass between a pair of glass plates. Such laminated glass used for openings of vehicles or buildings are required to have high heat shielding properties.

Infrared rays having a wavelength of 780 nm or longer, which is longer than a wavelength of visible light, have a small amount of energy compared to ultraviolet rays. Infrared rays, however, have a large thermal effect, and are emitted as heat when absorbed by a substance. For this reason, infrared rays are commonly referred to as heat rays. Therefore, infrared rays are required to be sufficiently shielded in order to give a laminated glass having better heat shielding properties.

The below-mentioned Patent Document 1 discloses an interlayer film containing a tin-doped indium oxide particle (a ITO particle) or an antimony-doped tin oxide particle (an ATO particle) as an interlayer film that effectively blocks infrared rays (heat rays). The below-mentioned Patent Document 2 discloses an interlayer film containing a tungsten oxide particle.

PRIOR ART DOCUMENT

Patent Document

Patent Document 1: WO 2001/025162 A1
Patent Document 2: WO 2005/087680 A1

SUMMARY OF THE INVENTION

Problems to be Solved by the Invention

Laminated glass using an interlayer film containing a heat shielding particle such as a ITO particle and an ATO particle is desired to have both high heat shielding properties and a high visible transmittance. That is, laminated glass is required to have high heat shielding properties while retaining a high visible transmittance. Laminated glass is also required to retain a high visible transmittance for a long period of time.

The conventional laminated glasses described in Patent Documents 1 and 2 may not have high heat shielding properties and high visible transmittance at the same time. Furthermore, the visible transmittance of such laminated glass may decrease while the laminated glass is used. In particular, there is a problem that, when the laminated glass has an interlayer film containing a tungsten oxide particle and is used for a long period of time, the visible transmittance is likely to greatly decrease.

Also, when laminated glass is used as a windshield of vehicles such as a car, the adhesion of the interlayer film to the glass plates constituting the laminated glass is desired to be adjustable to a suitable range.

The present invention aims to provide an interlayer film for laminated glass which has high heat shielding properties, a high visible transmittance, and excellent light resistance enabling retention of a high visible transmittance for a long period of time; and laminated glass including the interlayer film for laminated glass.

The present invention more specifically aims to provide an interlayer film for laminated glass which has high heat shielding properties, a high visible transmittance, excellent light resistance enabling retention of a high visible transmittance for a long period of time, and adhesion that is easily adjustable; and laminated glass including the interlayer film for laminated glass.

Means for Solving the Problems

According to one wide aspect of the present invention, an interlayer film for laminated glass with a single layer structure or a laminated structure of two or more layers is provided, the interlayer film comprising: a first layer containing a polyvinyl acetal resin; a plasticizer; a tungsten oxide particle; a magnesium salt of an organic acid having a branched structure; and a metal salt of a C2 to C8 organic acid, other than the magnesium salt of an organic acid having a branched structure.

The interlayer film for laminated glass of the present invention may be a monolayered interlayer film for laminated glass only comprising the above first layer, or may be a multilayered interlayer film for laminated glass comprising the above first layer.

In the interlayer film for laminated glass according to the present invention, the C2 to C8 organic acid is preferably a C2 to C8 organic acid having a linear structure. Also, the C2 to C8 organic acid is preferably a C2 to C6 organic acid having a linear structure.

In a specific aspect of the interlayer film for laminated glass according to the present invention, the C2 to C8 organic acid is a C2 to C6 organic acid having a branched structure.

In the interlayer film for laminated glass according to the present invention, the magnesium salt of an organic acid having a branched structure is preferably a magnesium salt of a C6 to C12 organic acid having a branched structure. The magnesium salt of an organic acid having a branched structure is preferably magnesium bis(2-ethylbutyrate).

In the interlayer film for laminated glass according to the present invention, the first layer preferably has a magnesium concentration of 400 ppm or lower.

In the interlayer film for laminated glass according to the present invention, the tungsten oxide particle is preferably a caesium-doped tungsten oxide particle.

In the interlayer film for laminated glass according to the present invention, the first layer preferably further contains an ultraviolet shielding agent. The ultraviolet shielding agent is preferably a benzotriazol compound or a benzophenone compound.

The laminated glass of the present invention is laminated glass including: a first component for laminated glass; a second component for laminated glass; and an interlayer film sandwiched between the first component for laminated glass and the second component for laminated glass, wherein the interlayer film is the interlayer film for laminated glass formed in accordance with the present invention.

Effect of the Invention

The interlayer film for laminated glass according to the present invention is an interlayer film for laminated glass with a single layer structure or a laminated structure of two or more layers, the interlayer film comprising: a first layer containing a polyvinyl acetal resin; a plasticizer; a tungsten oxide particle; a magnesium salt of an organic acid having a branched structure; and a metal salt of a C2 to C8 organic acid, other than the magnesium salt of an organic acid having a branched structure. The interlayer film therefore has highlight resistance which enables retention of a high visible transmittance for a long period of time.

The interlayer film for laminated glass according to the present invention accordingly enables production of laminated glass that has high heat shielding properties and a high visible transmittance, and can retain a high visible transmittance for a long period of time.

BRIEF DESCRIPTION OF DRAWINGS

FIG. 1 is a partially cutout cross-sectional view schematically illustrating an interlayer film for laminated glass according to a first embodiment of the present invention.

FIG. 2 is a partially cutout cross-sectional view schematically illustrating an interlayer film for laminated glass according to a second embodiment of the present invention.

FIG. 3 is a partially cutout cross-sectional view schematically illustrating an example of laminated glass including the interlayer film for laminated glass illustrated in FIG. 1.

FIG. 4 is a partially cutout cross-sectional view schematically illustrating an example of the laminated glass including the interlayer film for laminated glass illustrated in FIG. 2.

MODE(S) FOR CARRYING OUT THE INVENTION

Hereinafter, the present invention will be described based on specific embodiments and examples of the present invention, with reference to drawings.

FIG. 1 illustrates a partially cutout cross-sectional view schematically illustrating an interlayer film for laminated glass according to a first embodiment of the present invention.

An interlayer film 31 illustrated in FIG. 1 is a monolayered interlayer film having a single layer structure. The interlayer film 31 is a first layer. The interlayer film 31 is used to obtain laminated glass. The interlayer film 31 is an interlayer film for laminated glass. The interlayer film 31 includes a polyvinyl acetal resin; a plasticizer; a tungsten oxide particle; a magnesium salt of an organic acid having a branched structure (hereinafter also referred to as a "magnesium salt P" of an organic acid); and a metal salt of a C2 to C8 organic acid (hereinafter, also referred to as a "metal salt Q" of an organic acid), other than the magnesium salt P of an organic acid having a branched structure. The metal salt Q of an organic acid does not include the magnesium salt P of an organic acid. That is, the magnesium salt P of an organic acid is not used as the metal salt Q of an organic acid.

FIG. 2 is a partially cutout cross-sectional view schematically illustrating an interlayer film for laminated glass according to a second embodiment of the present invention.

An interlayer film 1 illustrated in FIG. 2 is a multilayered interlayer film having a laminated structure of two or more layers. The interlayer film 1 is used to obtain laminated glass. The interlayer film 1 is an interlayer film for laminated glass. The interlayer film 1 is provided with a second layer 2, a first layer 3 arranged on a first surface 2a side of the second layer 2, and a third layer 4 arranged on a second surface 2b side of the second layer 2 which is the opposite side of the first surface 2a. The first layer 3 is laminated on the first surface 2a of the second layer 2. The third layer 4 is laminated on the second surface 2b of the second layer 2. The second layer 2 is an interlayer, and mainly functions as a layer for improving sound insulation, for example. The first layer 3 and the third layer 4 each function both as, for example, a protective layer and an adhesive layer, and are a surface layer in the present embodiment. The second layer 2 is arranged between the first layer 3 and the third layer 4. The second layer 2 is sandwiched between the first layer 3 and the third layer 4. The interlayer film 1 therefore has a multilayered structure in which the first layer 3, the second layer 2, and the third layer 4 are laminated in the stated order.

Other layer(s) may be arranged between the second layer 2 and the first layer 3 and between the second layer 2 and the third layer 4, respectively. Still, the second layer 2 and the first layer 3 are preferably directly laminated, and the second layer 2 and the third layer 4 are also preferably directly laminated. Examples of the other layer (s) include a layer containing a thermoplastic resin such as a polyvinyl acetal resin, and a layer containing a compound such as polyethylene terephthalate.

The first layer 3 includes a polyvinyl acetal resin, a plasticizer, a tungsten oxide particle, the magnesium salt P of an organic acid having a branched structure, and the metal salt Q of a C2 to C8 organic acid, other than the magnesium salt P of an organic acid having a branched structure. The first layer 3 preferably functions both as a protective layer and an adhesive layer, and more specifically is a surface layer.

The second layer 2 preferably contains a polyvinyl acetal resin and a plasticizer. If the amount of the plasticizer for each 100 parts by weight of the polyvinyl acetal resin contained in the second layer 2 is larger than the amount of the plasticizer for each 100 parts by weight of the polyvinyl acetal resin contained in the first layer 3, the sound insulation can be increased. The third layer 4 preferably contains a polyvinyl acetal resin and a plasticizer, and more preferably contains a polyvinyl acetal resin, a plasticizer, a tungsten oxide particle, the magnesium salt P of an organic acid, and the metal salt Q of an organic acid.

The first layer 3 and the third layer 4 each preferably contain an ultraviolet shielding agent. The compositions of the first layer 3 and the third layer 4 may be the same as or different from each other.

In the interlayer film 1, the first layer 3 is laminated on the first surface 2a of the second layer 2, and the third layer 4 is laminated on the second surface 2b of the second layer 2. The first layer 3 is preferably arranged on the first surface 2a side of the second layer 2, and the first layer 3 is preferably laminated on the first surface 2a of the second layer 2. Also, the second layer 2 is preferably arranged on one surface of the first layer 3, and the second layer 2 is preferably laminated on one surface of the first layer 3.

The second layer 2 may have the first layer 3 arranged only on the first surface 2a side of the second layer 2, and may not have the third layer 4 on the second surface 2b side of the second layer 2. Still, the first layer 3 is preferably arranged on the first surface 2a side of the second layer 2, and the third layer 4 is preferably arranged on the second surface 2b side of the second layer 2. The third layer 4 is preferably laminated on the second surface 2b of the second layer 2. If the third layer 4 is laminated on the second surface 2b of the second layer 2, the penetration resistance of the laminated glass including the interlayer film 1 can be further increased. Also, if the third layer 4 is laminated on the second surface 2b of the second layer 2, the handleability of the interlayer film 1 is also increased.

For the purpose of sufficiently high heat shielding properties and visible transmittance of the laminated glass, one of the main features of the first embodiment and the second embodiment is that the monolayered interlayer film 31 which is the first layer or the first layer 3 in the multilayered interlayer film essentially includes the following five components: a polyvinyl acetal resin; a plasticizer; a tungsten oxide particle; the magnesium salt P of an organic acid having a branched structure; and the metal salt Q of a C2 to C8 organic acid, other than the magnesium salt P of an organic acid having a branched structure. The tungsten oxide particle effectively increases the heat shielding properties of laminated glass. Use of the monolayered interlayer film 31 which is the first layer and the multilayered interlayer film 1 including the first layer 3 containing a polyvinyl acetal resin, a plasticizer, and a tungsten oxide particle enables the laminated glass to have a low solar transmittance which is an index of heat shielding properties, and to have a high visible transmittance. For example, such an interlayer film enables the laminated glass to have a solar transmittance (Ts2500) of 65% or lower in a wavelength of 300 to 2500 nm, and to have a visible transmittance of 65% or higher. Such an interlayer film can also give a solar transmittance (Ts2500) of 55% or lower, and a visible transmittance of 70% or higher.

The present inventors have found as a result of studies that the visible transmittance of laminated glass decreases when the laminated glass is used for a long period of time, if the laminated glass was produced by simply using an interlayer film which comprises the first layer containing a polyvinyl acetal resin, a plasticizer, and a tungsten oxide particle.

The present inventors therefore have further made studies, and have found compositions of an interlayer film and laminated glass which can retain a high visible transmittance for a long period of time.

For retention of a high visible transmittance for a long period of time, the monolayered interlayer film 31 which is the first layer in the first embodiment and the first layer 3 in the multilayered interlayer film 1 in the second embodiment each contain the magnesium salt P of an organic acid having a branched structure and the metal salt Q of a C2 to C8 organic acid, other than the magnesium salt P of an organic acid having a branched structure, as well as a polyvinyl acetal resin, a plasticizer, and a tungsten oxide particle. If the interlayer film 31 or the first layer 3 contains these five components, the laminated glass including the interlayer film 31 or the interlayer film 1 can have high light resistance, and therefore can retain a high visible transmittance for a long period of time. Particularly, combination use of the magnesium salt P of an organic acid and the metal salt Q of an organic acid contributes greatly to improvement of light resistance of the interlayer films 31 and the interlayer film 1 and laminated glass including the interlayer film 31 or the interlayer film 1, and to retention of the high visible transmittance of the laminated glass for a long period of time.

Also, if the interlayer film 31 and the first layer 3 each contain the metal salt Q of an organic acid as well as the magnesium salt P of an organic acid, it not only enables retention of a high visible transmittance of the interlayer films 31 and the interlayer film 1 and laminated glass including the interlayer film 31 or the interlayer film 1 for a long period of time, but also enables production of an interlayer film or laminated glass whose adhesion is easily adjustable.

Since the adhesion is easily adjustable, the first layer is preferably a layer laminated on a component for a laminated glass, is preferably a layer laminated on each of the first component for a laminated glass and the second component for a laminated glass, and preferably a layer laminated on a glass plate. At least one surface of the first layer is preferably a surface laminated on a component for a laminated glass, and preferably laminated on glass plate (s).

Hereinafter, the first layer, the second layer, and the third layer constituting the interlayer film for laminated glass according to the present invention, and components included in each of the first layer, the second layer, and the third layer are described in detail.

(Polyvinyl Acetal Resin)

The polyvinyl acetal resin contained in the first layer is not particularly limited. The second layer and the third layer each preferably contain a polyvinyl acetal resin. One polyvinyl acetal resin may be used alone, or two or more polyvinyl acetal resins may be used in combination. The polyvinyl acetal resins used for the first layer, the second layer, and the third layer may be the same as or different from one another. Combination use of polyvinyl acetal resin(s) and a plasticizer enables further increase of the adhesion of the first layer, the second layer, and the third layer to the components for laminated glasses or other layers.

The above polyvinyl acetal resin can be produced by, for example, acetalizing a polyvinyl alcohol with an aldehyde. The above polyvinyl alcohol can be produced by, for example, saponifying polyvinyl acetate. The polyvinyl alcohol typically has a saponification degree in the range from 70 to 99.9 mol %.

The polyvinyl alcohol preferably has an average polymerization degree of 200 or higher, more preferably 500 or higher, but preferably 3500 or lower, more preferably 3000 or lower, and still more preferably 2500 or lower. An average polymerization degree equal to the above lower limit or higher further increases the penetration resistance of the laminated glass. An average polymerization degree equal to the above upper limit or lower facilitates formation of the interlayer film.

The carbon number of the acetal group included in the polyvinyl acetal resin is not particularly limited. The aldehyde used in production of the polyvinyl acetal resin is not particularly limited. The carbon number of the acetal group in the polyvinyl acetal resin is preferably 3 or 4. A carbon number of the acetal group in the polyvinyl acetal resin of 3 or greater leads to a sufficiently low glass transition temperature of the interlayer film.

The aldehyde is not particularly limited. Typically, a C1 to C10 aldehyde can be suitably used as the above aldehyde. Examples of the C1 to C10 aldehyde include propionaldehyde, n-butyraldehyde, isobutyraldehyde, n-valeraldehyde, 2-ethylbutyraldehyde, n-hexylaldehyde, n-octyl aldehyde, n-nonyl aldehyde, n-decyl aldehyde, formaldehyde, acetaldehyde, and benzaldehyde. Particularly, propionaldehyde, n-butyraldehyde, isobutyraldehyde, n-hexylaldehyde, and n-valeraldehyde are preferred, propionaldehyde, n-butyraldehyde, and isobutyraldehyde are more preferred, and n-butyraldehyde is still more preferred. One of the aldehydes may be used alone, or two or more of the aldehydes may be used in combination.

The hydroxyl content (amount of hydroxyl groups) of the polyvinyl acetal resin is preferably 15 mol % or higher, and more preferably 18 mol % or higher, but is preferably 40 mol % or lower, and more preferably 35 mol % or lower. A hydroxyl content equal to the above lower limit or higher further increases the adhesion of the interlayer film. A hydroxyl content equal to the above upper limit or lower increases the flexibility of the interlayer film, which allows easy handling of the interlayer film.

The hydroxy group content in the polyvinyl acetal resin is a mole fraction expressed as percent obtained by dividing the amount of ethylene groups to which hydroxy groups are bonded by the total amount of ethylene groups in the main chain. It is possible to obtain the amount of ethylene groups to which hydroxy groups are bonded, for example, in accordance with JIS K6726 "Test Methods for Polyvinyl Alcohol".

The acetylation degree (amount of acetyl groups) of the polyvinyl acetal resin is preferably 0.1 mol % or more, more preferably 0.3 mol % or more, and still more preferably 0.5 mol % or more, but is preferably 30 mol % or less, more preferably 25 mol % or less, and still more preferably 20 mol % or less. An acetylation degree equal to the above lower limit or higher results in high compatibility between the polyvinyl acetal resin and the plasticizer. An acetylation degree equal to the above upper limit or lower results in high moisture resistance of the interlayer film and laminated glass.

The acetylation degree is obtained as described below. The amounts of ethylene groups to which acetal groups are bonded and to which ethylene groups are bonded are subtracted from the total amount of ethylene groups in the main chain. The obtained value is divided by the total amount of ethylene groups in the main chain. The obtained mole fraction expressed as percent is the acetylation degree. The amount of ethylene groups to which acetal groups are bonded can be measured in accordance with JIS K6728 "Test Methods for Polyvinyl butyral".

The acetalization degree (butyralization degree in the case of a polyvinyl butyral resin) of the polyvinyl acetal resin is preferably 60 mol % or more, and more preferably 63 mol % or more, but is preferably 85 mol % or less, more preferably 75 mol % or less, and still more preferably 70 mol % or less. An acetalization degree equal to the lower limit or higher results in high compatibility between the polyvinyl acetal resin and the plasticizer. An acetalization degree equal to the upper limit or lower shortens the reaction time it takes to produce a polyvinyl acetal resin.

The acetalization degree is a mole fraction expressed as percent obtained by dividing the amount of ethylene groups to which acetal groups are bonded by the total amount of ethylene groups in the main chain.

It is possible to obtain the acetalization degree by measuring the acetylation degree and the hydroxy group content in accordance with JIS K6728 "Test Methods for Polyvinyl butyral", calculating the molar fractions based on the measurement results, and subtracting the molar fractions of the acetylation degree and of the hydroxy group content from 100 mol %.

The hydroxyl content (amount of hydroxyl group), acetalization degree (butyralization degree), and the acetylation degree are preferably calculated from the results obtained by the method in accordance with JIS K 6728 "Testing Methods for Polyvinyl butyral". In the case that the polyvinyl acetal resin is a polyvinyl butyral resin, the hydroxyl content (amount of hydroxyl group), the acetalization degree (butyralization degree), and the acetylation degree are preferably calculated from the results obtained by the method in accordance with JIS K 6728 "Testing Methods for Polyvinyl butyral".

In the case that the interlayer film for laminated glass according to the present invention is a multilayered interlayer film which has a laminated structure of two or more layers, the polyvinyl acetal resin contained in the first layer and the third layer (hereinafter, such a resin is also referred to as a polyvinyl acetal resin A) and the polyvinyl acetal resin contained in the second layer (hereinafter, such a resin is also referred to as a polyvinyl acetal resin B) may be the same as or different from each other. For further increase in the sound insulation of the interlayer film for laminated glass according to the present invention, the polyvinyl acetal resin A and the polyvinyl acetal resin B are preferably different from each other.

For further increase in the penetration resistance of the laminated glass, the polyvinyl acetal resin A preferably has an acetylation degree of lower than 5 mol %, more preferably has an acetylation degree of lower than 5 mol % and a hydroxyl content of 20 mol % or higher and 40 mol % or lower, still more preferably has an acetylation degree of 3 mol % or lower and a hydroxyl content of 20 mol % or higher and 40 mol % or lower, and particularly preferably has an acetylation degree of 3 mol % or lower and a hydroxyl content of 25 mol % or higher and 35 mol % or lower.

For further increase in the sound insulation of the laminated glass, the polyvinyl acetal resin B is preferably a polyvinyl acetal resin B1 with an acetylation degree of 5 mol % or higher, a polyvinyl acetal resin B2 with an acetalization degree of 70 mol % or higher, or a polyvinyl acetal resin B3 obtained by acetalizing the polyvinyl alcohol with an aldehyde having a carbon number of 6 or greater.

Since the polyvinyl acetal resin B1 has an acetylation degree of 5 mol % or higher, a layer including the polyvinyl acetal resin B1 can contain a larger amount of a plasticizer. The interlayer film therefore has a sufficiently decreased glass transition temperature. The lower limit of the acetylation degree of the polyvinyl acetal resin B1 is more preferably 7 mol %, still more preferably 10 mol %, and particularly preferably 12 mol %, and the upper limit is preferably 30 mol %, more preferably 28 mol %, still more preferably 26 mol %, and particularly preferably 24 mol %. An acetylation degree in the above range of the lower limit to the upper limit enables further increase in the sound insulation of the laminated glass.

Since the polyvinyl acetal resin B2 has an acetalization degree of 70 mol % or higher, a layer including the polyvinyl acetal resin B2 can contain a larger amount of a plasticizer. The interlayer film therefore can have a sufficiently decreased glass transition temperature. The lower limit of the acetalization degree of the polyvinyl acetal resin B2 is more preferably 72 mol %, still more preferably 74 mol %, and particularly preferably 76 mol %, and the upper limit is preferably 88 mol %, more preferably 86 mol %, still more preferably 84 mol %, and particularly preferably 82 mol %. An acetalization degree in the above range of the lower limit to the upper limit enables further increase in the sound insulation of the laminated glass.

The above polyvinyl acetal resin B3 can be produced by acetalizing the above polyvinyl alcohol with an aldehyde having a carbon number of 6 or greater. The polyvinyl acetal resin B3 easily enables the interlayer film to have a decreased glass transition temperature. Suitable examples of the aldehyde having a carbon number of 6 or greater include 2-ethylbutyraldehyde, n-hexylaldehyde, n-octyl aldehyde, n-nonyl aldehyde, and n-decyl aldehyde.

(Plasticizer)

The first layer contains a polyvinyl acetal resin and a plasticizer, whereby the adhesion of the interlayer film or the first layer is increased. For further increase in the adhesion of the interlayer film or the second layer and the third layer, the second layer and the third layer each preferably contain a polyvinyl acetal resin and a plasticizer. The plasticizer is not particularly limited, and may be a conventionally known plasticizer. One of the plasticizers may be used alone, or two or more of the plasticizers may be used in combination. The plasticizers used for the first layer, the second layer, and the third layer may be the same as or different from one another.

Examples of the plasticizer include organic ester plasticizers such as monobasic organic acid esters and polybasic organic acid esters, and phosphoric acid plasticizers such as organic phosphoric acid plasticizers and organic phosphorous acid plasticizers. Particularly, organic ester plasticizers are preferred. The plasticizer is preferably a liquid plasticizer.

Examples of the monobasic organic acid esters include, but not particularly limited to, glycol esters obtained by the reaction between a glycol and a monobasic organic acid, and esters of triethylene glycol or tripropylene glycol and a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, heptyl acid, n-octylic acid, 2-ethylhexyl acid, n-nonylic acid, and decyl acid.

Examples of the polybasic organic acid esters include, but not particularly limited to, ester compounds of polybasic organic acids and C4 to C8 linear or branched alcohols. Examples of the polybasic organic acid include adipic acid, sebacic acid, and azelaic acid.

Examples of the organic ester plasticizers include, but not particularly limited to, triethylene glycol di-2-ethyl butyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctylazelate, dibutylcarbitol adipate, ethylene glycol di-2-ethyl butyrate, 1,3-propylene glycol di-2-ethyl butyrate, 1,4-butylene glycol di-2-ethyl butyrate, diethylene glycol di-2-ethyl butyrate, diethylene glycol di-2-ethylhexanoate, dipropylene glycol di-2-ethyl butyrate, triethylene glycol di-2-ethyl pentanoate, tetraethylene glycol di-2-ethyl butyrate, diethylene glycol dicaprylate, dihexyl adipate, dioctyl adipate, hexylcyclohexyl adipate, a mixture of heptyl adipate and nonyl adipate, diisononyl adipate, diisodecyl adipate, and heptylnonyl adipate, dibutyl sebacate, oil-modified alkyd sebacate, and a mixture of a phosphoric acid ester and an adipic acid ester. Organic ester plasticizers other than these may also be used.

Examples of the organic phosphoric acid plasticizer include, but not particularly limited to, tributoxyethyl phosphate, isodecyl phenyl phosphate, and triisopropyl phosphate.

The plasticizer is preferably a diester plasticizer represented by the following formula (1).

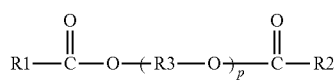

Formula (1)

In the above formula (1), R1 and R2 each represent a C5 to C10 organic group, R3 represents an ethylene group, an isopropylene group, or an n-propylene group, and p represents an integer of 3 to 10. R1 and R2 in the above formula (1) each are preferably a C6 to 010 organic group.

The plasticizer preferably includes at least one selected from triethylene glycol di-2-ethylhexanoate (3GO) and triethylene glycol di-2-ethylbutyrate (3 GH), and more preferably includes triethylene glycol di-2-ethylhexanoate.

In the first layer, the amount of the plasticizer for each 100 parts by weight of the polyvinyl acetal resin is preferably 25 parts by weight or more, and more preferably 30 parts by weight or more, but is preferably 60 parts by weight or less, and more preferably 50 parts by weight or less. If the second layer and the third layer each contain a polyvinyl acetal resin and a plasticizer, the amount of the plasticizer in each of the second layer and the third layer is preferably in the above range from the lower limit to the upper limit. An amount of the plasticizer equal to the above lower limit or more further increases the penetration resistance of the laminated glass. An amount of the plasticizer equal to the above upper limit or less further increases the transparency of the interlayer film.

In the case that the interlayer film for laminated glass according to the present invention is a multilayered interlayer film having a laminated structure of two or more layers, the amount of the plasticizer in the second layer is preferably larger than the amount of the plasticizer in the first layer and the third layer, for further increase in the sound insulation. Especially when the polyvinyl acetal resin contained in the second layer is the polyvinyl acetal resin B, the amount X (parts by weight) of the plasticizer for each 100 parts by weight of the polyvinyl acetal resin in the second layer is preferably larger than the amount Y (parts by weight) of the plasticizer for each 100 parts by weight of the polyvinyl acetal resin in the first layer and the third layer. For further increase in the sound insulation, the amount X is preferably larger than the amount Y by 5 parts by weight or more, more preferably by 10 parts by weight or more, still more preferably by 15 parts by weight or more, and particularly preferably by 20 parts by weight or more.

The lower limit of the amount X is preferably 50 parts by weight, more preferably 55 parts by weight, still more preferably 60 parts by weight, and particularly preferably 65 parts by weight, while the upper limit is preferably 80 parts by weight, more preferably 78 parts by weight, still more preferably 76 parts by weight, and particularly preferably 74 parts by weight. An amount X equal to the above lower limit or more further increases the sound insulation of the laminated glass. An amount X equal to the above upper limit or less further increases the transparency of the interlayer film.

The lower limit of the amount Y is preferably 20 parts by weight, more preferably 25 parts by weight, still more preferably 30 parts by weight, and particularly preferably 35 parts by weight, while the upper limit is preferably 55 parts by weight, more preferably 50 parts by weight, still more preferably 45 parts by weight, and particularly preferably 40 parts by weight. An amount Y equal to the lower limit or more further increases the penetration resistance of the laminated glass. An amount Y equal to the above upper limit or less further increases the transparency of the interlayer film.

(Tungsten Oxide Particle)

The tungsten oxide particle contained in the first layer is a heat shielding particle. The second layer and the third layer each may contain a tungsten oxide particle. If the second layer and the third layer contain the tungsten oxide particle, the second layer and the third layer preferably contain the magnesium salt P of an organic acid having a branched structure, and the metal salt Q of a C2 to C8 organic acid, other than the magnesium salt P of an organic acid having a branched structure.

The tungsten oxide particle is generally represented by the following formula (X1) or the following formula (X2). For the interlayer film for laminated glass according to the present invention, a tungsten oxide particle represented by the following formula (X1) or the following formula (X2) are suitable for use.

$$W_yO_z \qquad \text{Formula (X1)}$$

In the above formula (X1), W represents tungsten, O represents oxygen, and y and z satisfy the relation $2.0 < z/y < 3.0$.

$$M_xW_yO_z \qquad \text{Formula (X2)}$$

In the above formula (X2), M is at least one selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re; W represents tungsten, O represents oxygen, and x, y, and z satisfy $0.001 \leq x/y \leq 1$ and $2.0 < z/y \leq 3.0$.

For further increase in the heat shielding properties of the interlayer film and the laminated glass, the tungsten oxide particle is preferably a metal-doped tungsten oxide particle. The above term "a tungsten oxide particle" includes a metal-doped tungsten oxide particle. Specific examples of the metal-doped tungsten oxide particle include a sodium-doped tungsten oxide particle, a caesium-doped tungsten oxide particle, a thallium-doped tungsten oxide particle, and a rubidium-doped tungsten oxide particle.

For further increase in the heat shielding properties of the interlayer film and the laminated glass, a caesium-doped tungsten oxide particle is particularly preferred. For further increase in the heat shielding properties of the interlayer film and the laminated glass, the caesium-doped tungsten oxide particle is preferably a tungsten oxide particle represented by the formula: $Cs_{0.33}WO_3$.

The tungsten oxide particle preferably has an average particle size of 0.01 μm or larger, more preferably 0.02 μm or larger, and preferably 0.1 μm or smaller, and more preferably 0.05 μm or smaller. An average particle size equal to the above lower limit or larger leads to sufficiently high heat-ray shielding properties. An average particle size equal to the above upper limit or smaller further increases the transparency of the interlayer film.

The above term "average particle size" means a volume-average particle size. The average particle size can be measured using a device such as a particle size distribution measuring device ("UPA-EX 150" produced by Nikkiso Co., Ltd.).

The amount of the tungsten oxide particle is not particularly limited. The amount of tungsten oxide particle in 100 wt % of the first layer is preferably 0.001 wt % or more, more preferably 0.01 wt % or more, and still more preferably 0.05 wt % or more, but is preferably 3 wt % or less, more preferably 1 wt % or less, and still more preferably 0.5 wt % or less. An amount of the tungsten oxide particle in the above range from the lower limit to the upper limit can sufficiently increase the heat shielding properties, and sufficiently increase the visible transmittance. For example, such an amount can give a visible transmittance of 70% or higher to the laminated glass. In the case that the second layer and the third layer each contain a tungsten oxide particle, the preferred lower limit and upper limit for the amount of the tungsten oxide particle in the second layer and the third layer are the same as the respective preferred lower limit and upper limit for the amount of the tungsten oxide particle in the first layer.

(Magnesium Salt P of Organic Acid Having Branched Structure)

The first layer contains the magnesium salt P of an organic acid having a branched structure. The organic acid having a branched structure is not particularly limited, and is preferably a carboxylic acid having a branched structure. The lower limit for the number of carbons of the organic acid having a branched structure or the carboxylic acid having a branched structure is preferably 5, and the upper limit is preferably 12, more preferably 10, and still more preferably 8. The number of carbons equal to the lower limit or greater further increases the light resistance of the interlayer film and the laminated glass. The number of carbons equal to the upper limit or smaller further increases the transparency of the interlayer film. The magnesium salt P of an organic acid having a branched structure is preferably a magnesium salt of a C6 to C12 organic acid having a branched structure.

Examples of the organic acid having a branched structure or the carboxylic acid having a branched structure include, but not particularly limited to, 2-methylbutyric acid, 2-ethylbutyric acid, 2-ethylpentanoic acid, and 2-ethylhexanoic acid. Magnesium salts of these acids are suitable for use. Accordingly, the magnesium salt of an organic acid having a branched structure is preferably magnesium bis(2-methylbutyrate), magnesium bis(2-ethylbutyrate), magnesium bis(2-methylpentanoate), magnesium bis(2-ethylpentanoate), or magnesium bis(2-ethylhexanoate). Among these, magnesium bis(2-ethylbutyrate), magnesium bis(2-methylpentanoate), or magnesium bis(2-ethylhexanoate) is more preferred, magnesium bis(2-ethylbutyrate) or magnesium bis(2-methylpentanoate) is still more preferred, and magnesium bis(2-ethylbutyrate) is particularly preferred, for retention of a high visible transmittance for a long period of time. The magnesium salt P of an organic acid may be dissociated to form magnesium ions in the first layer.

If the first layer contains the tungsten oxide particle and the magnesium salt P of an organic acid, the light resistance achieved by the tungsten oxide particle can be improved. That is, it is possible to provide an interlayer film for laminated glass which has high heat shielding properties, a high visible transmittance, and excellent light resistance which enables retention of a high visible transmittance for a long period of time.

The amount of the magnesium salt P of an organic acid in the first layer, when the amount is defined as the amount of magnesium and magnesium ions (magnesium concentration, magnesium concentration which derives from the magnesium salt P of an organic acid), is preferably 5 ppm or higher, more preferably 10 ppm or higher, and still more preferably 20 ppm or higher, but is preferably 300 ppm or lower, more preferably 250 ppm or lower, and still more preferably 200 ppm or lower. If the second layer and the third layer contain the magnesium salt P of an organic acid, the preferred lower limit and upper limit for the amount of the magnesium salt P of an organic acid in each of the second layer and the third layer are the same as the preferred lower limit and upper limit for the amount of the magnesium salt P of an organic acid in the first layer. An amount of the magnesium salt P of an organic acid in the range from the above lower limit to the upper limit enables production of an interlayer film for laminated glass which is capable of retaining a high visible transmittance for a longer period of time.

(Metal Salt Q of C2 to C8 Organic Acid, Other than Magnesium Salt P of Organic Acid)

The first layer contains the magnesium salt P of an organic acid having a branched structure, and the metal salt Q of a C2 to C8 organic acid other than the magnesium salt P of an organic acid having a branched structure. The metal salt Q of an organic acid is preferably, but not particularly limited to, a metal salt of carboxylic acid, and preferably a magnesium salt of carboxylic acid or a potassium salt of carboxylic acid. Suitable examples of the magnesium salt of carboxylic acid include magnesium bis(acetate), magnesium bis(propionate), magnesium bis(butyrate), magnesium bis(pentanoate), magnesium bis(hexanoate), magnesium bis(heptanoate), magnesium bis(octanoate), magnesium bis(4-methylvalerate), magnesium bis(3-methylcaproate), magnesium bis(5-methylcaproate), and magnesium bis(caproate), and these magnesium salts are suitable for use. Suitable examples of the potassium salt of carboxylic acid include potassium acetate, potassium propionate, potassium butyrate, potassium pentanoate, potassium hexanoate, potassium heptanoate, and potassium octanoate, and these potassium salts are suitable for use.

Use of the metal salt Q of an organic acid enables production of an interlayer film for laminated glass which has high heat shielding properties, a high visible transmittance, and excellent light resistance enabling retention of a high visible transmittance for a long period of time. Furthermore, use of the metal salt Q not only gives high heat shielding properties and high visible transmittance and enables retention of a high visible transmittance for a long period of time, but also enables production of an interlayer film or laminated glass whose adhesion is easily adjustable.

The C2 to C8 organic acid in the metal salt Q of an organic acid preferably has a linear structure. A C2 to C8 organic acid having a linear structure not only leads to excellent light resistance but also enables production of an interlayer film whose adhesion is more easily adjustable.

The number of carbons of the C2 to C8 organic acid is not particularly limited. For easier adjustment of the adhesion of the interlayer film, the C2 to C8 organic acid in the metal salt Q of an organic acid preferably has a smaller number of carbon atoms than that of the organic acid having a branched structure in the magnesium salt P of an organic acid, is more preferably a C2 to C6 organic acid, and is still more preferably a C2 to C5 organic acid. A C2 to C6 organic acid having a linear structure or a C2 to C5 organic acid having a linear structure enables easier adjustment of the adhesion of the interlayer film. A C2 to C6 organic acid having a branched structure or a C2 to C5 organic acid having a branched structure enables further increase in the light resistance of the interlayer film.

The C2 to C8 organic acid in the metal salt Q of an organic acid may be a C2 to C6 organic acid having a branched structure.

The amount of the metal salt Q of an organic acid in the first layer, when the amount is defined as the amount of the metal or metal ions (metal concentration, metal concentration which derived from the metal salt Q of an organic acid) (if the metal salt Q is a magnesium salt, the amount of magnesium and magnesium ions (magnesium concentration, magnesium concentration which derived from the metal salt Q of an organic acid), is preferably 5 ppm or higher, more preferably 10 ppm or higher, and still more preferably 20 ppm or higher, but is preferably 300 ppm or lower, more preferably 250 ppm or lower, and still more preferably 200 ppm or lower. If the second layer and the third layer each contain the metal salt Q of an organic acid, the preferred lower limit and upper limit for the amount of the metal salt Q of an organic acid in each of the second layer and the third layer are the same as the preferred lower limit and upper limit for the amount of the metal salt Q of an organic acid in the first layer. An amount of the metal salt Q of an organic acid in the range from the above lower limit to the upper limit enables production of an interlayer film for laminated glass enabling retention of a high visible transmittance for a longer period of time.

The total amount of the metal and metal ions in the first layer is preferably 400 ppm or less, more preferably 300 ppm or less, and still more preferably 250 ppm or less. Especially in terms of easier adjustment of the adhesion of the interlayer film, the amount of magnesium and magnesium ions (magnesium concentration, total magnesium concentration) in the first layer is preferably 400 ppm or less, more preferably 300 ppm or less, and still more preferably 250 ppm or less.

(Ultraviolet Shielding Agent)

The interlayer film for laminated glass according to the present invention preferably contains an ultraviolet shielding agent in the first layer. Also in the case of a multilayered interlayer film for laminated glass having at least the first layer and the second layer, the first layer preferably contains an ultraviolet shielding agent. The third layer preferably contains an ultraviolet shielding agent. Use of an ultraviolet shielding agent prevents the visible transmittance from easily decreasing when the interlayer film and laminated glass are used for a long period of time. One of the ultraviolet shielding agents may be used alone, or two or more of the ultraviolet shielding agents may be used in combination.

The ultraviolet shielding agent includes an ultraviolet absorber. The ultraviolet shielding agent is preferably an ultraviolet absorber.

Examples of widely known common ultraviolet shielding agents include a metal ultraviolet shielding agent, a metal oxide ultraviolet shielding agent, a benzotriazol compound, a benzophenone compound, a triazine compound, and a benzoate compound.

Examples of the metal ultraviolet absorber include a platinum particle, a particle obtained by covering the surface of a platinum particle with silica, a palladium particle, and a particle obtained by covering the surface of a palladium particle with silica. The ultraviolet shielding agent is preferably not a heat shielding particle. The ultraviolet shielding agent is preferably a benzotriazol compound, a benzophenone compound, a triazine compound, or a benzoate compound, more preferably a benzotriazol compound or a benzophenone compound, and still more preferably a benzotriazol compound.

Examples of the metal oxide ultraviolet absorber include zinc oxide, titanium oxide, and cerium oxide. The surface of the metal oxide ultraviolet absorber may be covered. Examples of the coating material for the surface of the metal oxide ultraviolet absorber include insulating metal oxides, hydrolyzable organic silicon compounds, and silicone compounds.

Examples of the insulating metal oxide include silica, alumina, and zirconia. The insulating metal oxide has a bandgap energy of, for example, 5.0 eV or higher.

Examples of the benzotriazol compound include benzotriazol compounds such as 2-(2'-hydroxy-5'-methylphenyl) benzotriazol ("Tinuvin P", product of BASF A.G.), 2-(2'-hydroxy-3',5'-di-t-butylphenyl)benzotriazol ("Tinuvin 320", product of BASF A.G.), 2-(2'-hydroxy-3'-t-butyl-5-methylphenyl)-5-chlorobenzotriazole ("Tinuvin 326", product of BASF A.G.), and 2-(2'-hydroxy-3',5'-di-amylphenyl)benzotriazol ("Tinuvin 328", product of BASF A.G.). The ultraviolet shielding agent is preferably a benzotriazol compound containing a halogen atom, and more preferably a benzotriazol compound containing a chlorine atom because they show excellent performance of absorbing ultraviolet rays.

Examples of the benzophenone compound include octabenzone ("Chimassorb 81", product of BASF A.G.).

Examples of the benzoate compound include 2,4-di-tert-butylphenyl-3,5-di-tert-butyl-4-hydroxybenzoate ("Tinuvin 120", product of BASF A.G.).

For further prevention of a decrease in the visible transmittance of the interlayer film and laminated glass over time, the ultraviolet shielding agent is preferably 2-(2'-hydroxy-3'-t-butyl-5-methylphenyl)-5-chlorobenzotriazole ("Tinuvin 326", product of BASF A.G.) or 2-(2'-hydroxy-3',5'-di-amylphenyl)benzotriazol ("Tinuvin 328", product of BASF A.G.), and is more preferably 2-(2'-hydroxy-3'-t-butyl-5-methylphenyl)-5-chlorobenzotriazole.

The amount of the ultraviolet shielding agent is not particularly limited. For further suppression of a decrease in the visible transmittance over time, the amount of the ultraviolet shielding agent in 100 wt % of the first layer, if the first layer contains an ultraviolet shielding agent, is preferably 0.1 wt % or more, more preferably 0.2 wt % or more, still more preferably 0.3 wt % or more, and particularly preferably 0.5 wt % or more, but preferably 2.5 wt % or less, more preferably 2 wt % or less, still more preferably 1 wt % or less, and particularly preferably 0.8 wt % or less. For further suppression of a decrease in the visible transmittance over time, if the second layer contains an ultraviolet shielding agent or the third layer contains an ultraviolet shielding agent, the amount of the ultraviolet shielding agent in 100 wt % of the second layer or the third layer is preferably 0.1 wt % or more, more preferably 0.2 wt % or more, still more preferably 0.3 wt % or more, and particularly preferably 0.5 wt % or more, but is preferably 2.5 wt % or less, more preferably 2 wt % or less, still more preferably 1 wt % or less, and particularly preferably 0.8 wt % or less. Particularly when the amount of the ultraviolet shielding agent in 100 wt % of the first layer is 0.2 wt % or more, or when the amount of the ultraviolet shielding agent in 100 wt % of the second layer or the third layer is 0.2% of the weight or more, a decrease in the visible transmittance of the interlayer film and the laminated glass over time can be notably suppressed.

The interlayer film for laminated glass according to the present invention preferably contains the tungsten oxide particle and the ultraviolet shielding agent at a weight ratio (wt %) (a tungsten oxide particle:ultraviolet shielding agent) of 4:1 to 1:200, and more preferably 2:1 to 1:100. Especially when the interlayer film for laminated glass according to the present invention is a monolayered interlayer film for laminated glass which has only the first layer, the first layer preferably contains the tungsten oxide particle and the ultraviolet shielding agent at a weight ratio (wt %) (a tungsten oxide particle:ultraviolet shielding agent) of 4:1 to 1:200, and more preferably 2:1 to 1:100. Also in the case that the interlayer film for laminated glass according to the present invention is a multilayered interlayer film, the first layer preferably contains the tungsten oxide particle and the ultraviolet shielding agent at the above weight ratio (wt %). If the weight ratio (wt %) of the tungsten oxide particle and the ultraviolet shielding agent is in the above range, the heat shielding properties and the visible transmittance of the interlayer film and the laminated glass, and the visible transmittance of the interlayer film and the laminated glass over time can be further increased.

(Antioxidant)

The interlayer film for laminated glass according to the present invention preferably contains an antioxidant. The first layer preferably contains an antioxidant, and the second layer and the third layer preferably contain an antioxidant. One of the antioxidants may be used alone, or two or more of the antioxidants may be used in combination.

Examples of the antioxidant include phenolic antioxidants, sulfuric antioxidants, and phosphoric antioxidants. The phenolic antioxidants are antioxidants with a phenol skeleton. The sulfuric antioxidants are antioxidants containing sulfur atoms. The phosphoric antioxidants are antioxidants containing phosphorus atoms.

The antioxidant is preferably a phenolic antioxidant. Examples of the phenolic antioxidants include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis(4-methyl-6-butylphenol), 2,2'-methylenebis(4-ethyl-6-t-butylphenol), 4,4'-butylidene-bis(3-methyl-6-t-butylphenol), 1,1,3-tris(2-methyl-hydroxy-5-t-butylphenyl)butane, tetrakis[methylene-3-(3',5'-butyl-4-hydroxyphenyl)propionate] methane, 1,3,3-tris(2-methyl-4-hydroxy-5-t-butylphenol) butane, 1,3,5-trimethyl-2,4,6-tris(3,5-di-t-butyl-4-hydroxybenzyl)benzene, bis(3,3'-t-butylphenol)butyric acid glycol ester, and pentaerythritol tetrakis[3-(3,5-di-tert-butyl-4-hydroxyphenyl)propionate. One or two or more of these antioxidants may be suitably used.

For more effective retention of the high visible transmittance of the interlayer film and laminated glass for a long period of time, the antioxidant is preferably 2,6-di-t-butyl-p-cresol (BHT) or pentaerythritol tetrakis[3-(3,5-di-tert-butyl-4-hydroxyphenyl)propionate.

Examples of the antioxidants which are commercially available include "Sumilizer BHT" produced by Sumitomo Chemical Co., Ltd., and "IRGANOX 1010" produced by Ciba Geigy.

(Other Components)

The interlayer film for laminated glass according to the present invention may optionally contain additives such as a light stabilizer, a fire retardant, an antistatic agent, a pigment, a dye, an adhesion adjuster, a moisture resistance agent, a fluorescent brightener, and an infrared absorber. Each of these additives may be used alone, or two or more of these may be used in combination.

(Interlayer Film for Laminated Glass)

The thickness of the interlayer film for laminated glass according to the present invention is not particularly limited. In terms of the practicality and in terms of a sufficient increase in the heat shielding properties, the thickness of the interlayer film is preferably 0.1 mm or larger, and more preferably 0.25 mm or larger, but is preferably 3 mm or smaller, and more preferably 1.5 mm or smaller. A thickness of the interlayer film equal to the lower limit or larger leads to high penetration resistance of the laminated glass.

The method for producing the interlayer film for laminated glass is not particularly limited. The method for producing the interlayer film can be a conventionally known method. Examples of the method include a production method including mixing the components described above and forming an interlayer film. Since the interlayer film is suitable for continuous production, a production method through extrusion molding is preferred. At the time of obtaining the interlayer film, it is preferable to prepare a dispersion liquid obtained by dispersing a tungsten oxide particle in a plasticizer, mix the dispersion liquid with other components (preferably thermoplastic resin), and thereby form the interlayer film. Also at the time of obtaining the interlayer film, it is preferable to prepare a dispersion liquid obtained by dispersing the tungsten oxide particle in a plasticizer, mix the dispersion liquid with other components (preferably thermoplastic resin), and thereby mold the interlayer film. Use of such a dispersion liquid gives favorable dispersibility to the tungsten oxide particle in the interlayer film, whereby the effect of adding the tungsten oxide particle can be achieved more evenly in the interlayer film.

The method of kneading is not particularly limited. Examples thereof include methods using an extruder, a plastograph, a kneader, a Banbury mixer, or a calendering roll. Particularly, methods using an extruder are preferred because such methods are suitable for continuous production, and methods using a twin-screw extruder are more preferred. For production of the interlayer film for laminated glass according to the present invention, the first layer, the second layer, and the third layer may be separately produced and the first layer, the second layer, and the third layer may be laminated into a multilayered interlayer film, or the first layer, the second layer, and the third layer may be laminated through co-extrusion to form an interlayer film.

(Laminated Glass)

FIG. 3 is a cross-sectional view illustrating laminated glass that includes the interlayer film 31 for laminated glass according to the first embodiment of the present invention.

Laminated glass 16 illustrated in FIG. 3 is provided with the interlayer film 31, the first component for laminated glass 21 and the second component for laminated glass 22. The interlayer film 31 is sandwiched between the first component for laminated glass 21 and the second component for laminated glass 22. The first component for laminated glass 21 is laminated on a first surface 31a of the interlayer film 31. The second component for laminated glass 22 is laminated on a second surface 31b of the interlayer film 31 which is the opposite side of the first surface 31a.

FIG. 4 is a cross-sectional view illustrating laminated glass that includes the interlayer film 1 for laminated glass according to the second embodiment of the present invention.

Laminated glass 11 illustrated in FIG. 4 is provided with the interlayer film 1, the first component for laminated glass 21 and the second component for laminated glass 22. The interlayer film 1 is sandwiched between the first component for laminated glass 21 and the second component for laminated glass 22. The first component for laminated glass 21 is laminated on a first surface 1a of the interlayer film 1. The second component for laminated glass 22 is laminated on a second surface 1b of the interlayer film 1 which is the opposite side of the first surface 1a. The first component for laminated glass 21 is laminated on a surface 3a which is the outer surface of the first layer 3. The second component for laminated glass 22 is laminated on a surface 4a which is the outer surface of the third layer 4.

As described above, the laminated glass of the present invention includes the first component for laminated glass, the second component for laminated glass, and the interlayer film sandwiched between the first component for laminated glass and the second component for laminated glass, wherein the interlayer film is the interlayer film for laminated glass according to the present invention.

Examples of the first component for laminated glass, the second component for laminated glass include glass plates and PET (polyethylene terephthalate) films. The laminated glass encompasses laminated glass with the interlayer film sandwiched between two glass plates, and also laminated glass with an interlayer film sandwiched between a glass plate and a PET film or the like. The laminated glass is preferably a laminate including at least one glass plate.

Examples of the glass plate include inorganic glass plates and organic glass plates. Examples of the inorganic glass include float plate glass, heat absorbing glass, heat reflecting glass, polished plate glass, molded plate glass, meshed plate glass, wired plate glass, clear glass, and green glass. The organic glass is synthetic resin glass substituted for inorganic glass. Examples of the organic glass plates include polycarbonate plates and poly(meth)acrylate resin plates. Examples of the poly(meth)acrylate resin plates include polymethyl (meth)acrylate resin plates.

The thickness of each of the component for laminated glass is not particularly limited, and is preferably 1 mm or larger, but preferably 5 mm or smaller, and more preferably 3 mm or smaller. In the case that the component for laminated glass is a glass plate, the thickness of the glass plate is preferably 1 mm or larger, but preferably 5 mm or smaller, and more preferably 3 mm or smaller. In the case that the component for laminated glass is a PET film, the thickness of the PET film is preferably 0.03 mm or larger, but preferably 0.5 mm or smaller.

The production method of the laminated glass is not particularly limited. For example, an interlayer film is sandwiched between the first component for laminated glass, the second component for laminated glass, and the resulting product is pressed by a pressing roll or vacuumed under reduced pressure in a rubber bag so that the air remaining between the first component for laminated glass or the second component for laminated glass and the interlayer film is removed. Thereafter, the components are preliminarily adhered at about 70 to 110° C. to obtain a laminate. Next, the laminate is put in an autoclave or is pressed, and the laminate is pressure-bonded at about 120 to 150° C. under a pressure of 1 to 1.5 MPa. Thereby, laminated glass can be obtained. The interlayer film and the laminated glass can be used for cars, railcars, aircrafts, boats and ships, and buildings. The interlayer film is preferably an interlayer film for buildings or vehicles, and more preferably an interlayer film for vehicles. The laminated glass is preferably laminated glass for buildings or cars, and more preferably laminated glass for cars. The interlayer film and the laminated glass can also be used for other uses. The interlayer film and the laminated glass can be used for windshields, side glass, rear glass, roof glass, or the like of cars. Since the interlayer film and the laminated glass have high heat shielding properties and a high visible transmittance, the interlayer film and the laminated glass are suitable for cars.

For obtaining laminated glass with better transparency, the visible transmittance of the laminated glass is preferably 65% or higher, and more preferably 70% or higher. The visible transmittance of the laminated glass can be determined based on JIS R3211 (1998). The visible transmittance of laminated glass obtained by sandwiching the interlayer film for laminated glass according to the present invention between two 2-mm-thick green glass plates in accordance with JIS R 3208 is preferably 65% or higher, and more preferably 70% or higher. The visible transmittance of laminated glass obtained by sandwiching the interlayer film for laminated glass according to the present invention between two 2.5-mm-thick clear glass plates in accordance with JIS R 3202 is preferably 65% or higher, and more preferably 70% or higher.

The solar transmittance (Ts2500) of the laminated glass is preferably 65% or lower, more preferably 60% or lower, and still more preferably 55% or lower. The solar transmittance of the laminated glass can be measured in accordance with JIS R 3106 (1998). The solar transmittance of the laminated glass obtained by sandwiching the interlayer film for laminated glass according to the present invention between two 2-mm-thick green glass plates in accordance with JIS R 3208 is preferably 65% or lower, more preferably 60% or lower, and still more preferably 55% or lower. The solar transmittance of the laminated glass obtained by sandwiching the interlayer film for laminated glass according to the present invention between two 2.5-mm-thick clear glass plates in accordance with JIS R 3202 is preferably 65% or lower, more preferably 60% or lower, and still more preferably 55% or lower.

The laminated glass has a haze value of preferably 2% or lower, more preferably 1% or lower, still more preferably 0.5% or lower, and particularly preferably 0.4% or lower. The haze value of the laminated glass can be measured in accordance with JIS K 6714.

Hereinafter, the present invention will be described in more detail based on examples. The present invention is not limited to these examples.

The following materials were used in the examples and comparative examples.

Polyvinyl Acetal Resin:

"PVB", product of Sekisui Chemical Co., Ltd. (polyvinyl butyral resin acetalized with n-butyraldehyde, average polymerization degree: 1700, hydroxyl content: 30.5 mol %, acetylation degree: 1 mol %, butyralization degree: 68.5 mol %)

Polyvinyl butyral resin (polyvinyl butyral resin obtained by acetalizing a polyvinyl alcohol with an average polymerization degree of 1700 with n-butyraldehyde, acetylation degree: 1 mol %, hydroxyl content: 31 mol %, butyralization degree: 68 mol %)

Polyvinyl butyral resin (polyvinyl butyral resin obtained by acetalizing a polyvinyl alcohol with an average polymerization degree of 2300 with n-butyraldehyde, acetylation degree: 12 mol %, hydroxyl content: 24 mol %, butyralization degree: 64 mol %)

Polyvinyl butyral resin (polyvinyl butyral resin obtained by acetalizing a polyvinyl alcohol with an average polymerization degree of 2400 with n-butyraldehyde, acetylation degree: 1 mol %, hydroxyl content: 20 mol %, butyralization degree: 79 mol %)

Plasticizer:

3GO (triethylene glycol di-2-ethylhexanoate)

Magnesium Salt P of Organic Acid Having Branched Structure:

Magnesium bis(2-ethylbutyrate)

Magnesium bis(2-methylvalerate)

Metal Salt Q of C2 to C8 Organic Acid, Other than the Magnesium Salt P of Organic Acid Having Branched Structure:

Magnesium bis(acetate)

Magnesium bis(hexanoate)

Magnesium bis(4-methylvalerate)

Magnesium bis(3-methylcaproate)

Magnesium bis(5-methylcaproate)

Magnesium bis(caproate)

Potassium acetate

Tungsten Oxide Particle (Heat Shielding Particle):

Caesium doped-tungsten oxide particle ($Cs_{0.33}WO_3$)

Ultraviolet Shielding Agent:

Ultraviolet absorber (2-(2'-hydroxy-3'-t-butyl-5-methylphenyl)-5-chlorobenzotriazole, "Tinuvin 326" produced by BASF A.G.)

Antioxidant:

Antioxidant ("H-BHT" produced by Kyodo Chemical Co., Ltd.)

Example 1

(1) Production of Interlayer Film

An amount of 0.2 parts by weight of an ethanol solution containing magnesium bis(2-ethylbutyrate) and magnesium bis(acetate) was prepared. The amount of magnesium bis(2-ethylbutyrate) used was such an amount that gives a concentration of magnesium and magnesium ions in the interlayer film to be obtained (magnesium concentration which derives from the magnesium salt P of an organic acid) of 25 ppm, and the amount of magnesium bis(acetate) used was such an amount that gives a concentration of magnesium and magnesium ions in the interlayer film to be obtained (magnesium concentration which derives from the metal salt Q of an organic acid) of 25 ppm. Triethylene glycol di-2-ethylhexanoate (3GO) in an amount of 40 parts by weight, a tungsten oxide particle in an amount corresponding to 0.07 wt % in 100 wt % of the interlayer film to be obtained, and the ethanol solution obtained in an amount of 0.2 parts by weight were mixed in a horizontal micro bead mill, so that a dispersion was obtained.

To 100 parts by weight of polyvinyl butyral resin (PVB) were added the obtained dispersion, an antioxidant ("H-BHT" produced by Kyodo Chemical Co., Ltd.) in an amount corresponding to 1 wt % in 100 wt % of the interlayer film to be obtained, and an ultraviolet shielding agent ("Tinuvin 326" produced by BASF) in an amount corresponding to 1 wt % in 100 wt % of the interlayer film to be obtained. The resulting mixture was sufficiently kneaded by a mixing roll, so that a composition was obtained.

The obtained composition was extruded using an extruder, and thereby a monolayered interlayer film having a thickness of 760 µm was obtained.

(2) Production of Laminated Glass A

The obtained interlayer film was cut into a size of 30 cm in length×30 cm in width. Next, two green glass plates (30 cm in length×30 cm in width×2 mm in thickness) in accordance with JIS R 3208 were prepared. The obtained interlayer film was sandwiched between these two green glass plates. The product was retained in a vacuum laminator for 30 minutes at 90° C. and then vacuum-pressed, so that a laminate was obtained. The portion of the interlayer film protruding out of the glass plates in the laminate was cut off, whereby a laminated glass A was obtained.

(3) Production of Laminated Glass B (for Pummel Value Measurement)

Laminated glass B which is the same as the laminated glass A except its size was produced. That is, the obtained interlayer film was cut into a size of 100 cm in length×100 cm in width. Next, two green glass plates (100 cm in length×100 cm in width×2 mm in thickness) in accordance with JIS R 3208 were prepared. The obtained interlayer film was sandwiched between these two green glass plates. The product was retained in a vacuum laminator for 30 minutes at 90° C. and then vacuum-pressed, so that a laminate was obtained. The portion of the interlayer film protruding out of the glass plates in the laminate was cut off, whereby a laminated glass B was obtained.

Example 2

An interlayer film, a laminated glass A and a laminated glass B were obtained in the same manner as in Example 1, except that the amount of the tungsten oxide particle used was changed to an amount that would give the amount shown in the following Table 2 in 100 wt % of the interlayer film to be obtained.

Example 3

In Example 3, the interlayer film obtained in Example 2 was used. A laminated glass A was obtained in the same manner as in Example 2, except that the two green glass plates were changed to two clear glass plates (30 cm in length×30 cm in width×2.5 mm in thickness) based on JIS R3202. A laminated glass B was obtained in the same manner as in Example 2, except that the two green glass plates were changed to two clear glass plates (100 cm in length×100 cm in width×2.5 mm in thickness) based on JIS R3202.

Comparative Example 1

An interlayer film, a laminated glass A and a laminated glass B were obtained in the same manner as in Example 3, except that the magnesium salt P of an organic acid and the metal salt Q of an organic acid were not used.

Examples 4 to 11

An interlayer film, a laminated glass A and a laminated glass B were obtained in the same manner as in Example 1, except that the kind of the polyvinyl butyral resin used was changed, the amount of the tungsten oxide particle was changed to an amount that would give the amount shown in the following Table 2 in 100 wt % of the interlayer film to be obtained, the kinds and amounts of each of the magnesium salt P of an organic acid having a branched structure and the metal salt Q of a C2 to C8 organic acid other than the above magnesium salt of an organic acid having a branched structure were set as shown in the following Table 2. The polyvinyl butyral resin used here was a polyvinyl butyral resin obtained by acetalizing a polyvinyl alcohol having an average polymerization degree of 1700 with n-butyraldehyde (acetylation degree: 1 mol %, hydroxyl content: 31 mol %, butyralization degree: 68 mol %).

Comparative Example 2

An interlayer film, a laminated glass A and a laminated glass B were obtained in the same manner as in Example 1, except that the amount of the tungsten oxide particle was changed to an amount that would give the amount shown in the following Table 2 in 100 wt % of the interlayer film to be obtained, the magnesium salt P of an organic acid having a branched structure was not used, and the kind and amount of the metal salt Q of a C2 to C8 organic acid other than the above magnesium salt of an organic acid having a branched structure were set as shown in the following Table 2.

Example 12

(1) Compositions for Forming First Layer and Third Layer

An amount of 0.2 parts by weight of an ethanol solution containing magnesium bis(2-ethylbutyrate) and magnesium bis(acetate) was prepared. The amount of magnesium bis(2-ethylbutyrate) used was such an amount that gives a concentration of magnesium and magnesium ions in the interlayer film to be obtained (magnesium concentration which derives from the magnesium salt P of an organic acid) of 35 ppm, and the amount of magnesium bis(acetate) used was such an amount that gives a concentration of magnesium and magnesium ions in the interlayer film to be obtained (magnesium concentration which derives from the metal salt Q of an organic acid) of 35 ppm. Triethylene glycol di-2-ethylhexanoate (3GO) in an amount of 40 parts by weight, a tungsten oxide particle in an amount corresponding to 0.085 wt % in 100 wt % of each of the first layer and the third layer to be obtained, and the obtained ethanol solution in an amount of 0.2 parts by weight were mixed in a horizontal micro bead mill, so that a dispersion was obtained.

To 100 parts by weight of a polyvinyl butyral resin (polyvinyl butyral resin obtained by acetalizing a polyvinyl alcohol having an average polymerization degree of 1700 with n-butyraldehyde (acetylation degree: 1 mol %, hydroxyl content: 31 mol %, butyralization degree: 68 mol %)) were added the obtained dispersion, an antioxidant ("H-BHT" produced by Kyodo Chemical Co., Ltd.) in an amount corresponding to 1 wt % in 100 wt % of each of the first layer and the third layer to be obtained, and an ultraviolet shielding agent ("Tinuvin 326" produced by BASF A.G.) in an amount corresponding to 1 wt % in 100 wt % of each of the first layer and the third layer to be obtained. The resulting mixture was sufficiently kneaded by a mixing roll, so that a composition for forming the first layer and the third layer was produced.

(2) Composition for Second Layer

An amount of 0.2 parts by weight of an ethanol solution containing magnesium bis(2-ethylbutyrate) and magnesium bis(acetate) was prepared. The amount of magnesium bis(2-ethylbutyrate) used was such an amount that gives a concentration of magnesium and magnesium ions in the interlayer film to be obtained (magnesium concentration which derives from the magnesium salt P of an organic acid) of 35 ppm, and the amount of magnesium bis(acetate) was such an amount that gives a concentration of magnesium and magnesium ions in the interlayer film to be obtained (magnesium concentration which derives from the metal salt Q of an organic acid) of 35 ppm. Triethylene glycol di-2-ethylhexanoate (3GO) in an amount of 60 parts by weight, a tungsten oxide particle in an amount corresponding to 0.085 wt % in 100 wt % of the second layer to be obtained, and the obtained ethanol solution in an amount of 0.2 parts by weight were mixed in a horizontal micro bead mill, so that a dispersion was obtained.

To 100 parts by weight of a polyvinyl butyral resin (polyvinyl butyral resin obtained by acetalizing a polyvinyl alcohol having an average polymerization degree of 2300 with n-butyraldehyde (acetylation degree: 12 mol %, hydroxyl content: 24 mol %, butyralization degree: 64 mol %)) were added the obtained dispersion, an antioxidant ("H-BHT" produced by Kyodo Chemical Co., Ltd.) in an amount corresponding to 1 wt % in 100 wt % of the second layer to be obtained, and an ultraviolet shielding agent ("Tinuvin 326" produced by BASF A.G.) in an amount corresponding to 1 wt % in 100 wt % of the second layer to be obtained. The resulting mixture was sufficiently kneaded by a mixing roll, so that a composition for forming the second layer was produced.

The obtained compositions for the first layer, the second layer, and the third layer were extruded by a co-extruder to obtain an 800-μm-thick multilayered interlayer film (350-μm-thick first layer/100-μm-thick second layer/350-μm- thick third layer). A laminated glass A and a laminated glass B were obtained in the same manner as in Example 1.

Example 13

An interlayer film, a laminated glass A and a laminated glass B were obtained in the same manner as in Example 12, except that the polyvinyl butyral resin used in production of the composition for forming a second layer was a polyvinyl butyral resin obtained by acetalizing a polyvinyl alcohol having an average polymerization degree of 2400 with n-butyraldehyde (acetylation degree: 1 mol %, hydroxyl content: 20 mol %, butyralization degree: 79 mol %).

(Evaluation)

(1) Measurement of Visible Transmittance (A-Light-Y-Value, Initial A-Y (380 to 780 nm))

The visible transmittance of the obtained laminated glass A in a wavelength of 380 to 780 nm was measured using a spectrophotometer ("U-4100" produced by Hitachi High-Technologies Corporation) in accordance with JIS R 3211 (1998).

(2) Measurement of Solar Transmittance (Initial Ts2500 (300 to 2500 nm))

The solar transmittance Ts (Ts2500) of the obtained laminated glass A in a wavelength of 300 to 2500 nm was measured using a spectrophotometer ("U-4100" produced by Hitachi High-Technologies Corporation) in accordance with JIS R 3106 (1998).

(3) Light Resistance

Using an ultraviolet lamp ("HLG-2S" produced by Suga Test Instruments Co., Ltd.), the laminated glass A was irradiated with ultraviolet rays (quartz glass mercury lamp (750 W)) for 250 hours and for 500 hours in accordance with JIS R 3205. The A-Y of the laminated glass after the 250-hour irradiation and 500-hour irradiation were measured by the above method.

From the obtained measurement values, ΔA-Y ((A-Y after the ultraviolet irradiation)−(initial A-Y)) were calculated. Similarly, the solar transmittance Ts (Ts 2500) of the laminated glass after the 250-hour irradiation and 500-hour irradiation were measured by the above method. From the obtained measurement values, ΔTs 2500 (Ts2500 after the ultraviolet irradiation)−(initial Ts2500)) was calculated.

(4) Adhesive Strength (Pummel)

The obtained laminated glass B (100 cm in length×100 cm in width) was kept at −18° C.±0.6° C. for 16 hours. The center portion (area of 15 cm length×15 cm width) of the laminated glass B after storage was hit by a hammer with a 0.45 kg head, and the scattered fragments of the glass were smashed until the size of the glass fragments was 6 mm or smaller. After the center portion (area of 15 cm in length× and 15 cm in width) of the laminated glass B was smashed, the exposure degree (area %) of the interlayer film was determined to find the pummel value from the following Table 1.

TABLE 1

| Exposure degree of interlayer film (area %) | Pummel value |
|---|---|
| 90 < Exposure degree ≤ 100 | 0 |
| 85 < Exposure degree ≤ 90 | 1 |
| 60 < Exposure degree ≤ 85 | 2 |
| 40 < Exposure degree ≤ 60 | 3 |
| 20 < Exposure degree ≤ 40 | 4 |
| 10 < Exposure degree ≤ 20 | 5 |
| 5 < Exposure degree ≤ 10 | 6 |
| 2 < Exposure degree ≤ 5 | 7 |
| Exposure degree ≤ 2 | 8 |

The following Table 2 shows the results. In the following Table 2, the amount of a tungsten oxide particle is the amount in 100 wt % of the monolayered interlayer film which is the first layer. The magnesium concentration which derives from the magnesium salt P of an organic acid and the metal salt Q of an organic acid each are the concentration in the monolayered interlayer film which is the first layer.

TABLE 2

| | Composition of interlayer film | | | | | |
|---|---|---|---|---|---|---|
| | Amount of tungsten oxide particle: wt % | Magnesium salt P of organic acid | Magnesium concentration which derives from magnesium salt P of organic acid ppm | Metal salt Q of organic acid | Magnesium concentration which derives from metal salt Q of organic acid ppm | Glass plate used for laminated glass |
| Example 1 | 0.070 | Magnesium bis(2-ethylbutyrate) | 25 | Magnesium bis(acetate) | 25 | Green glass |
| Example 2 | 0.085 | Magnesium bis(2-ethylbutyrate) | 25 | Magnesium bis(acetate) | 25 | Green glass |
| Example 3 | 0.085 | Magnesium bis(2-ethylbutyrate) | 25 | Magnesium bis(acetate) | 25 | Clear glass |
| Comp. Ex 1 | 0.085 | — | — | — | — | Clear glass |
| Example 4 | 0.085 | Magnesium bis(2-ethylbutyrate) | 35 | Magnesium bis(acetate) | 35 | Clear glass |
| Example 5 | 0.085 | Magnesium bis(2-ethylbutyrate) | 25 | Magnesium bis(hexanoate) | 25 | Clear glass |
| Example 6 | 0.085 | Magnesium bis(2-ethylbutyrate) | 25 | Magnesium bis(4-methylvalerate) | 25 | Clear glass |
| Example 7 | 0.085 | Magnesium bis(2-ethylbutyrate) | 25 | Magnesium bis(3-methylcaproate) | 25 | Clear glass |
| Example 8 | 0.085 | Magnesium bis(2-ethylbutyrate) | 25 | Magnesium bis(5-methylcaproate) | 25 | Clear glass |
| Example 9 | 0.085 | Magnesium bis(2-methylvalerate) | 25 | Magnesium bis(acetate) | 25 | Clear glass |
| Example 10 | 0.085 | Magnesium bis(2-methylvalerate) | 25 | Magnesium bis(caproate) | 25 | Clear glass |
| Example 11 | 0.085 | Magnesium bis(2-ethylbutyrate) | 50 | Potassium acetate | 25 | Clear glass |
| Comp. Ex 2 | 0.085 | — | — | Potassium acetate | 50 | Clear glass |
| Example 12 | 0.085 | Magnesium bis(2-ethylbutyrate) | 35 | Magnesium bis(acetate) | 35 | Clear glass |
| Example 13 | 0.085 | Magnesium bis(2-ethylbutyrate) | 35 | Magnesium bis(acetate) | 35 | Clear glass |

TABLE 2-continued

| | Evaluation | | | | | | | |
|---|---|---|---|---|---|---|---|---|
| | Initial value | | | After ultraviolet irradiation (250 hrs) | | After ultraviolet irradiation (500 hrs) | |
| | A-Y % | Ts2500 % | Pummel value | ΔA-Y % | ΔTs2500 % | ΔA-Y % | ΔTs2500 % |
| Example 1 | 72.6 | 54.3 | 3 | −0.8 | −0.6 | −0.8 | −0.7 |
| Example 2 | 71.5 | 35.1 | 6 | −0.9 | −0.7 | −1.0 | −0.8 |
| Example 3 | 79.9 | 47.4 | 6 | −0.9 | −1.1 | −1.1 | −1.4 |
| Comp. Ex 1 | 80.2 | 47.7 | 8 | −2.6 | −4.2 | −3.0 | −4.9 |
| Example 4 | 79.7 | 47.2 | 2 | −0.8 | −1.0 | −1.1 | −1.3 |
| Example 5 | 80.0 | 47.5 | 4 | −0.9 | −1.1 | −1.1 | −1.4 |
| Example 6 | 80.2 | 47.6 | 5 | −0.7 | −0.8 | −0.8 | −0.9 |
| Example 7 | 79.8 | 47.2 | 3 | −0.8 | −1.2 | −1.1 | −1.3 |
| Example 8 | 80.0 | 47.4 | 5 | −0.8 | −1.1 | −1.1 | −1.5 |
| Example 9 | 79.8 | 47.5 | 5 | −0.8 | −1.0 | −1.1 | −1.5 |
| Example 10 | 80.1 | 47.6 | 3 | −0.7 | −0.9 | −0.9 | −1.2 |
| Example 11 | ○ | ○ | ○ | ○ | ○ | ○ | ○ |
| Comp. Ex 2 | ○ | X | ○ | ○ | ○ | ○ | ○ |
| Example 12 | 79.4 | 47.0 | 2 | −0.9 | −1.0 | −1.1 | −1.3 |
| Example 13 | 79.4 | 47.0 | 2 | −0.9 | −1.0 | −1.1 | −1.3 |

The evaluation results with "o" and "x" in Table 2 show the following evaluations: for A-Y, "o" means a value of 70% or higher, and "x" means a value lower than 70%; for Ts2500, "o" means a value of 70% or lower, and "x" means a value higher than 70%; for the pummel value, "o" means a value in the range from 2 to 7, and "x" means a value out of the range from 2 to 7; for ΔA-Y (250 hours), "o" means a value of −2% or higher, and "x" means a value lower than −2%; for ΔTs2500 (250 hours), "o" means a value of 0% or lower, and "x" means a value higher than 0%; for ΔA-Y (500 hours), "o" means a value of −2% or higher, and "x" means a value lower than −2%; and for ΔTs2500 (500 hours), "o" means a value of 0% or lower, and "x" means a value higher than 0%.

EXPLANATION OF SYMBOLS

1: Interlayer film
1a: First surface
1b: Second surface
2: Second layer
2a: First surface
2b: Second surface
3: First layer
3a: Outer surface
4: Third layer
4a: Outer surface
11: Laminated glass
16: Laminated glass
21: First component for laminated glass
22: Second component for laminated glass
31: Interlayer film
31a: First surface
31b: Second surface

The invention claimed is:

1. An interlayer film for laminated glass with a single layer structure or a laminated structure of two or more layers, comprising:
a first layer containing a polyvinyl acetal resin; a plasticizer; a tungsten oxide particle; a magnesium salt of an organic acid having a branched structure; a metal salt of a C2 to C8 organic acid, other than the magnesium salt of an organic acid having a branched structure; and an ultraviolet shielding agent,
wherein the metal salt of a C2 to C8 organic acid, other than the magnesium salt of an organic acid having a branched structure, includes magnesium bis(acetate), magnesium bis(hexanoate), magnesium bis(4-methylvalerate), magnesium bis(3-methylcaproate), magnesium bis(5-methylcaproate), or magnesium bis(caproate),
wherein the amount of the ultraviolet shielding agent in 100 wt % of the first layer is 0.1 wt % or more, and
wherein the metal concentration of the metal salt of a C2 to C8 organic acid, other than the magnesium salt of an organic acid having a branched structure, in the first layer is 5 ppm or higher and 300 ppm or lower.

2. The interlayer film for laminated glass according to claim 1,
wherein the C2 to C8 organic acid is a C2 to C6 organic acid having a branched structure.

3. The interlayer film for laminated glass according to any one of claims 1 to 2,
wherein the first layer has a magnesium concentration of 400 ppm or lower.

4. The interlayer film for laminated glass according to any one of claims 1 to 2,
wherein the tungsten oxide particle is a cesium-doped tungsten oxide particle.

5. The interlayer film for laminated glass according to claim 1,
wherein the ultraviolet shielding agent is a benzotriazol compound or a benzophenone compound.

6. Laminated glass comprising:
a first component for laminated glass;
a second component for laminated glass; and
an interlayer film sandwiched between the first component for laminated glass and the second component for laminated glass,
wherein the interlayer film is the interlayer film for laminated glass according to any one of claims 1 to 2.

7. The interlayer film for laminated glass according to claim 1, wherein the C2 to C8 organic acid is a C2 to C8 organic acid having a linear structure.

8. The interlayer film for laminated glass according to claim 7,
wherein the C2 to C8 organic acid is a C2 to C6 organic acid having a linear structure.

9. The interlayer film for laminated glass according to any one of claims 1 to 2,
wherein the magnesium salt of an organic acid having a branched structure is a magnesium salt of a C6 to C12 organic acid having a branched structure.

10. The interlayer film for laminated glass according to claim 9,
wherein the magnesium salt of an organic acid having a branched structure is magnesium bis(2-ethylbutyrate).

* * * * *